United States Patent [19]
VanDenberg

[11] Patent Number: 5,417,453
[45] Date of Patent: May 23, 1995

[54] LIGHTWEIGHT FLATBED TRAILER

[76] Inventor: Ervin VanDenberg, 7934 Strausser St. NW, North Canton, Ohio 44720

[21] Appl. No.: 861,126

[22] Filed: Mar. 31, 1992

[51] Int. Cl.$^6$ ............................................. B62D 21/12
[52] U.S. Cl. .................................... 280/785; 180/311; 296/182; 296/204; 403/263; 403/375; 52/668
[58] Field of Search ............... 280/781, 785, 795, 789; 180/311; 296/187, 203, 204, 182; 52/664, 666, 668; 105/413, 414, 419; 403/263, 375, 380

[56] References Cited

U.S. PATENT DOCUMENTS

| | | | |
|---|---|---|---|
| 2,230,448 | 2/1941 | Best | 280/781 |
| 2,241,952 | 5/1941 | Lachman | 52/668 |
| 2,540,400 | 2/1951 | McHenry | 296/182 |
| 2,622,895 | 12/1952 | Larsen | 280/789 |
| 3,389,451 | 6/1968 | Speca et al. | 52/668 |
| 3,598,421 | 8/1971 | Mason, Jr. | 280/789 |
| 3,623,936 | 11/1971 | Hotz | 52/668 |
| 4,232,884 | 11/1980 | DeWitt | 280/785 |
| 4,534,589 | 8/1985 | Booher | 296/182 |
| 4,938,524 | 7/1990 | Straub et al. | 280/789 |
| 5,054,843 | 10/1991 | Gray | 296/204 |

Primary Examiner—Michael S. Huppert
Assistant Examiner—Paul Dickson
Attorney, Agent, or Firm—Hudak & Shunk Co.

[57] ABSTRACT

A lightweight structure for a flatbed trailer having a cellular stiffening structure formed from a plurality of vertically arranged partitions which form a multiplicity of polygonal cells is disclosed. The cellular structure has the advantage of providing a strong lightweight structure which efficiently transmits load forces from the floor structure to the base upon which the wheels, suspension system, kingpin and landing gear are mounted. The resulting trailer has about a 4000 pound weight advantage over conventional steel frame trailers and about a 2500 pound weight advantage over conventional aluminum frame trailers, which translates directly into increased payload capacity as the trailer of the invention is capable of carrying loads up to the maximum legal weight limits in most states.

19 Claims, 4 Drawing Sheets

LIGHTWEIGHT FLATBED TRAILER

FIELD OF THE INVENTION

The invention relates to a lightweight flatbed, trailer which meets or exceeds typical maximum load bearing requirements.

BACKGROUND OF THE INVENTION

Conventional flatbed trailers have a frame generally consisting of two flanged beams longitudinally spaced apart and connected to one another by a plurality of transverse beams or cross sills welded to the longitudinal beams. The frame provides a strong, rigid structure to which the floor or bed, landing gear, kingpin, wheels and suspension system are mounted. The frames for flatbed trailers are generally constructed from steel or aluminum beams. Trailers having an aluminum frame are more expensive than those having a steel frame, but are often preferred by those in the trucking business because of their lightweight. State regulations typically limit the total weight of the truck including the load, the trailer, and the tractor. The typical minimum weight for a flatbed trailer having a steel frame is about 10,000 pounds (about 4500 kg), whereas a trailer with an aluminum frame has a typical minimum weight of about 8,500 pounds (about 3900 kg). Either type of flatbed trailer is generally designed to handle loads in excess of the legal weight limits. Therefore, a trucker can haul at least about 1500 pounds (about 700 kg) more with a trailer having an aluminum frame than with a trailer having a steel frame. The resulting savings in wear and tear, labor, and fuel, can pay for the higher initial cost of an aluminum frame many times over during the typical life of a trailer.

For efficient trucking operations, wherein the total truck weight, including the trailer, load and tractor, are at the maximum legal limit, substantial cost savings are possible for even relatively modest reductions in trailer weight. Therefore, any significant reduction in trailer weight would be of great value to the trucking industry.

SUMMARY OF THE INVENTION

The invention relates to a structural design for a lightweight flatbed trailer capable of hauling various payloads such as to about 80,000 pounds (about 36,000 kg). The design has about a 4000 pound (about 1800 kg) weight advantage over conventional steel trailers and about a 2500 pound (about 1800 kg) weight advantage over conventional aluminum trailers, thereby allowing up to an additional 2500 to 4000 pounds (about 1100 to 1800 kg) of payload per trip. Such additional payload capability can provide substantial additional profit during the life of the trailer.

The trailer has a lightweight structure comprising a relatively thin bottom plate or lower skin secured to a strong, lightweight, cellular stiffening structure made from a plurality of intersecting partitions which form a multiplicity of polygonal cells, and a plurality of closely spaced stiffening slats secured to the top of the stiffening structure to support the top plate or flatbed floor. The layered structure is designed so that the top plate acts as a stressed outer skin which helps distribute the load uniformly over the slats, which in turn help distribute the load more uniformly over the cellular stiffening structure, which in turn efficiently distributes the load substantially uniformly over the bottom plate and support members, with the bottom plate also acting as a stressed outer skin. The resulting structure, by more efficiently distributing load forces through an integrated system of stressed members, is lighter in weight than conventional trailers, yet is capable of carrying loads up to and in excess of most state weight limits. The inherent structural stiffness of the invention allows for the use of lighter weight materials having a lower modulus of elasticity than that of steel (about $30 \times 10^6$ psi or about 207 GPa) or aluminum (about $10.3 \times 10^6$ psi or about 71 GPa).

In accordance with one aspect of the invention, the intersecting partitions are provided with interlocking slots to facilitate assembly. Additionally, slots are provided along the top edge of selected partitions to permit receipt of the slats which transmit load forces from the floor of the flatbed trailer to the cellular stiffening structure.

DESCRIPTION OF THE PREFERRED EMBODIMENT

Figure 1:
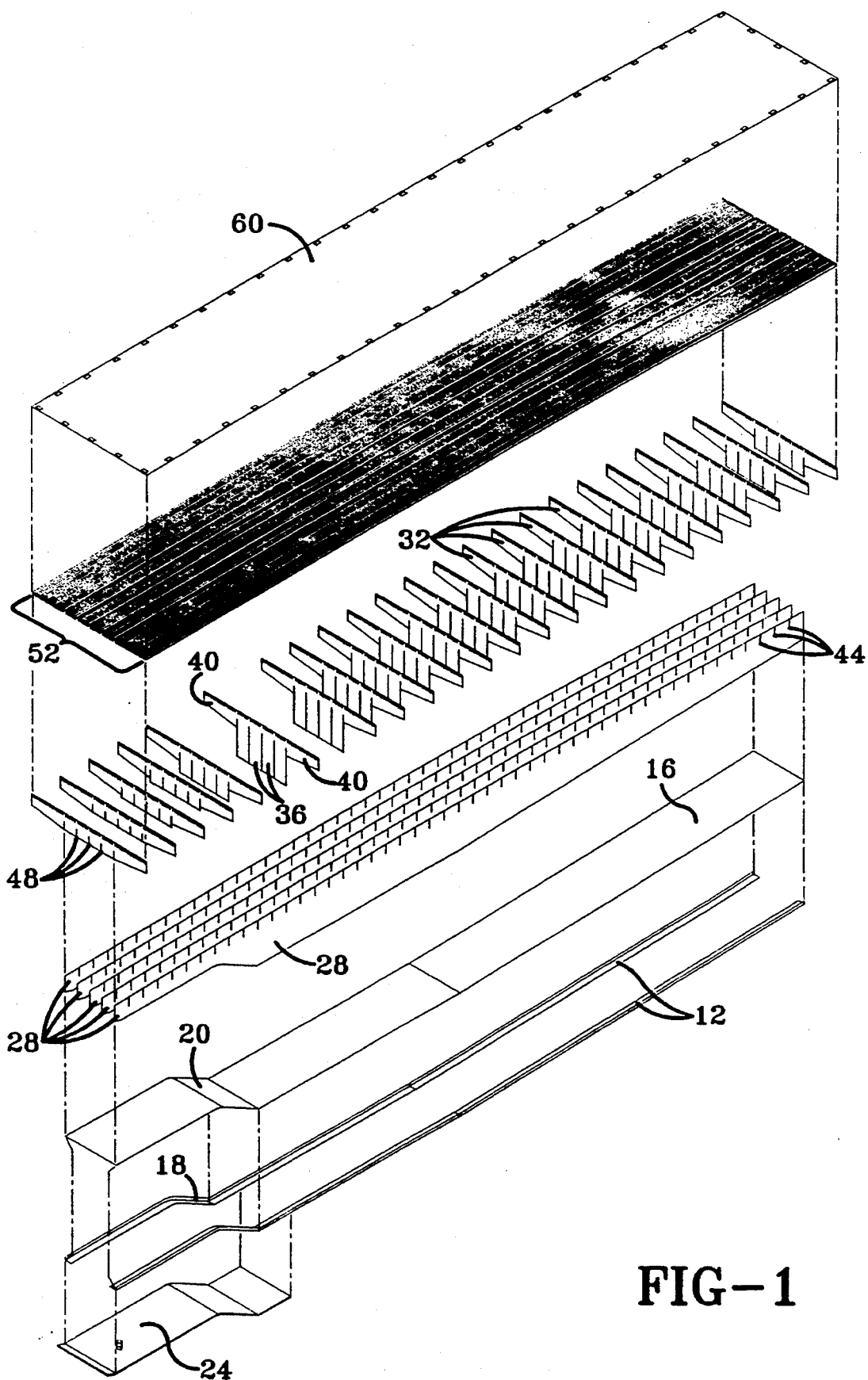
FIG. 1 shows an exploded perspective view of a flatbed trailer in accordance with the principles of the invention.

The structure of a lightweight trailer in accordance with the principles of the invention is most clearly understood with reference to the exploded perspective view of FIG. 1. The base of the trailer which acts as a lower stressed outer skin of the trailer structure is formed with a pair of spaced, substantially parallel longitudinal members 12 and an elongate bottom plate 16. The longitudinal members 12 and the bottom plate 16 are typically about 48 feet long, but can be shorter or longer if desired. Each member 12 and the bottom plate 16 can comprise two or more pieces fused, welded or otherwise bonded together to form an integrated unitary structure. The members 12 and the bottom plate 16 are formed with conforming inclined sections 18 and 20 to allow for installation of a kingpin mounting plate 24 at the forward end of the trailer to facilitate hitching of the trailer to a tractor.

The longitudinal members 12 preferably have an L-shaped cross section with the flanged segment arranged horizontally and the web being arranged upwardly from the outward side of the space between the members. The support members 12 are typically spaced so that the distance between the inside walls of the web is about 42 inches, although wider or narrower spacings are possible. The bottom plate 16 is dimensioned so that its width is substantially equal to the distance between the inside walls of the web of the longitudinal members 12, such that the bottom plate 16 substantially overlies and is supported by the flanged segments of the longitudinal members. The bottom plate 16 is welded, fused or otherwise bonded to the longitudinal members 12 to form the base of the trailer structure. A suitable aluminum longitudinal member has about a 4 inch (about 10 cm) flange, a 2 inch (about 5 cm) web, and a thickness of about 0.375 inch (about 1 cm). A suitable aluminum bottom plate has a thickness of about 0.125 inch (about 3 mm).

The longitudinal members 12 act as stiffeners for the stressed bottom plate 16 and, as is readily apparent from the thickness and other dimensions of the longitudinal members, do not act as major load bearing components as do the beams of a conventional trailer frame. The purpose of the longitudinal members of the preferred embodiment is primarily to provide structure onto which the landing gear, suspension, king pin, and wheels can be securely mounted. In fact, the longitudinal members 12 may be completely eliminated by increasing the thickness of the bottom plate 16 to provide sufficient stiffness to prevent undesirable deflection under load stresses. Elimination of the longitudinal members, however, is not preferred because the required additional thickness for the bottom plate 16 results in a heavier trailer.

A lightweight stiffening structure intermediate between the base and the bed floor is provided to distribute the bed load uniformly to the base and to give the trailer strength and rigidity. The stiffening structure is a cellular or macroscopic network type of structure comprised of a plurality of intersecting partitions forming a multiplicity of individual polygonal cells. In accordance with the preferred embodiment, five longitudinal partitions 28 are arranged in spaced parallel relationship. Each partition 28 is a thin substantially vertically arranged wall having a substantially straight horizontal upper edge and a lower edge which conforms to the shape of and is in continuous contact with the bottom plate 16, so that forces can be transmitted through each partition 28 to the bottom plate 16 at any point along the bottom edge of the partition. Each longitudinal partition 28 is substantially coextensive in length with the bottom plate 16. Adjacent longitudinal partitions 28 are uniformly spaced apart by a distance of about 1 foot (about 0.3 meters), although greater or smaller distances are possible.

A plurality of generally transverse partitions 32 are arranged to form typically vertical walls desirably perpendicular with the walls of partitions 28. Each transverse partition 32 has a central portion 36 having a flat bottom edge which continuously contacts the bottom plate to transmit forces through the stiffener 32 to the bottom plate 16 at any point along the bottom edge of the transverse partition. Each transverse partition 32 also has a pair of cantilevered sections 40 which project laterally outwardly from the sides of the central portion. The height of the central portion 36 varies among the transverse partitions 32 depending upon its position along the length of the trailer so that the top edges of all transverse partitions 32 are substantially located on the same horizontal plane and so that the bottom edge of each transverse partition 32 is in contact with the bottom plate 16. The length, as measured along the top edge, of each transverse member is typically 96 inches (about 244 cm) although larger and smaller width dimensions are possible. A suitable thickness for aluminum transverse partitions is about 0.03 inch (about 0.8 mm). The transverse partitions 32 are uniformly spaced apart by a distance approximately equal to the spacing between the longitudinal partitions 28. The spacing of the transverse partitions 32 for the preferred embodiment shown in FIG. 1 is about 1 foot (about 0.3 meters). Therefore, since the length of the trailer shown in FIG. 1 is about 48 feet (about 15 meters), 47 transverse partitions are required (for purposes of clarity, only a representative number of transverse partitions are shown in FIG. 1).

Both the longitudinal partitions 28 and the transverse partitions 32 are provided with slots 44 and 48 respectively to facilitate assembly of the cellular stiffening structure. Each longitudinal partition 28 has uniformly spaced vertical slots 44 at its upper edge. The number of slots in each longitudinal partition 28 is equal to the number of transverse partitions 32 which are to be used in the partition structure. The width of the slots 44 is approximately equal to the thickness of the transverse partitions 32. Each transverse partition 32 has a number of vertical slots. 48 equal to the number of longitudinal partitions 28. The width of the slots 48 is about equal to the thickness of the longitudinal partitions 28. The slots 44 and 48 allow for assembly of the partitions in interlocking relationship to form a multiplicity of polygonal cells. After being placed in interlocking relationship with the longitudinal partitions 28, the transverse partitions 32 are preferably welded, fused, or otherwise bonded to the longitudinal partitions 28 at selected locations to prevent movement of the partitions relative to one another due to vibration and/or loading during normal use and to produce a unitary cellular stiffening structure. The cellular stiffening structure is then welded, fused, or otherwise bonded or secured to the bottom plate 16 at selected locations to prevent movement relative to the bottom plate 16 during normal use.

Figure 2:
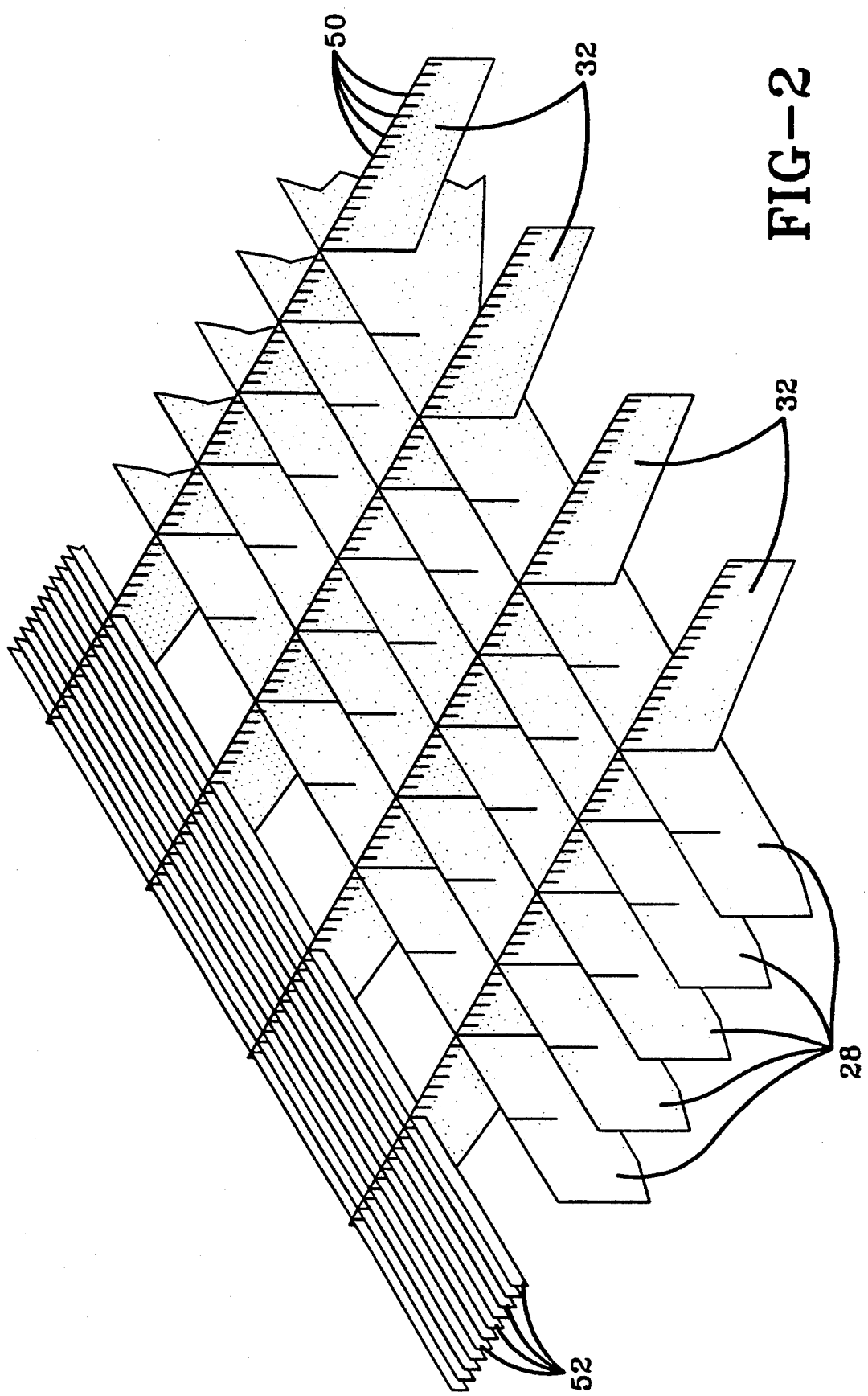
FIG. 2 is an enlarged prospective view of a segment of the stiffening structure of the flatbed trailer of FIG. 1, showing details thereof.

As best understood with reference to FIG. 2, a plurality of uniformly spaced, miniature vertical slots 50 are provided along the top edge of each transverse partition 32 to accommodate a plurality of parallel stiffening slats 52. The slots 52 are preferably closely spaced and run continuously the entire length of the trailer with their width dimension arranged vertically to efficiently transmit and uniformly distribute load forces to the cellular stiffening structure comprising partitions 28 and 32. In accordance with the preferred embodiment, aluminum slats 52 are about 576 inches (about 15 meters) long, about 2 inches in width, and about 0.03 inch (about 0.8 mm) thick. The slats 52 are preferably spaced apart by about 1.5 inches (about 3.8 cm).

A top plate 60 which acts as an upper stressed outer skin of the trailer structure is fastened to the trailer structure and covers the entire area of the trailer bed to help uniformly distribute load forces to the slats 52. In accordance with one aspect of the invention, the slats and the top plate can be integrally formed together as by extrusion. In accordance with the preferred embodiment, the top plate 60 is made of 0.065 inch (about 1.7 mm) thick aluminum sheeting or plates.

Figure 3:
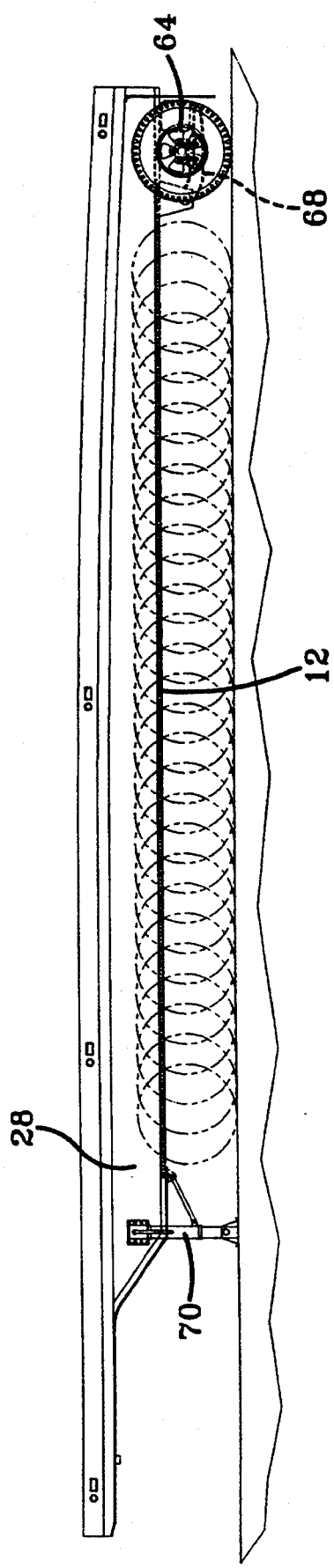
FIG. 3 is an elevation view of an assembled flatbed trailer in accordance with the principles of the invention.
Figure 4:
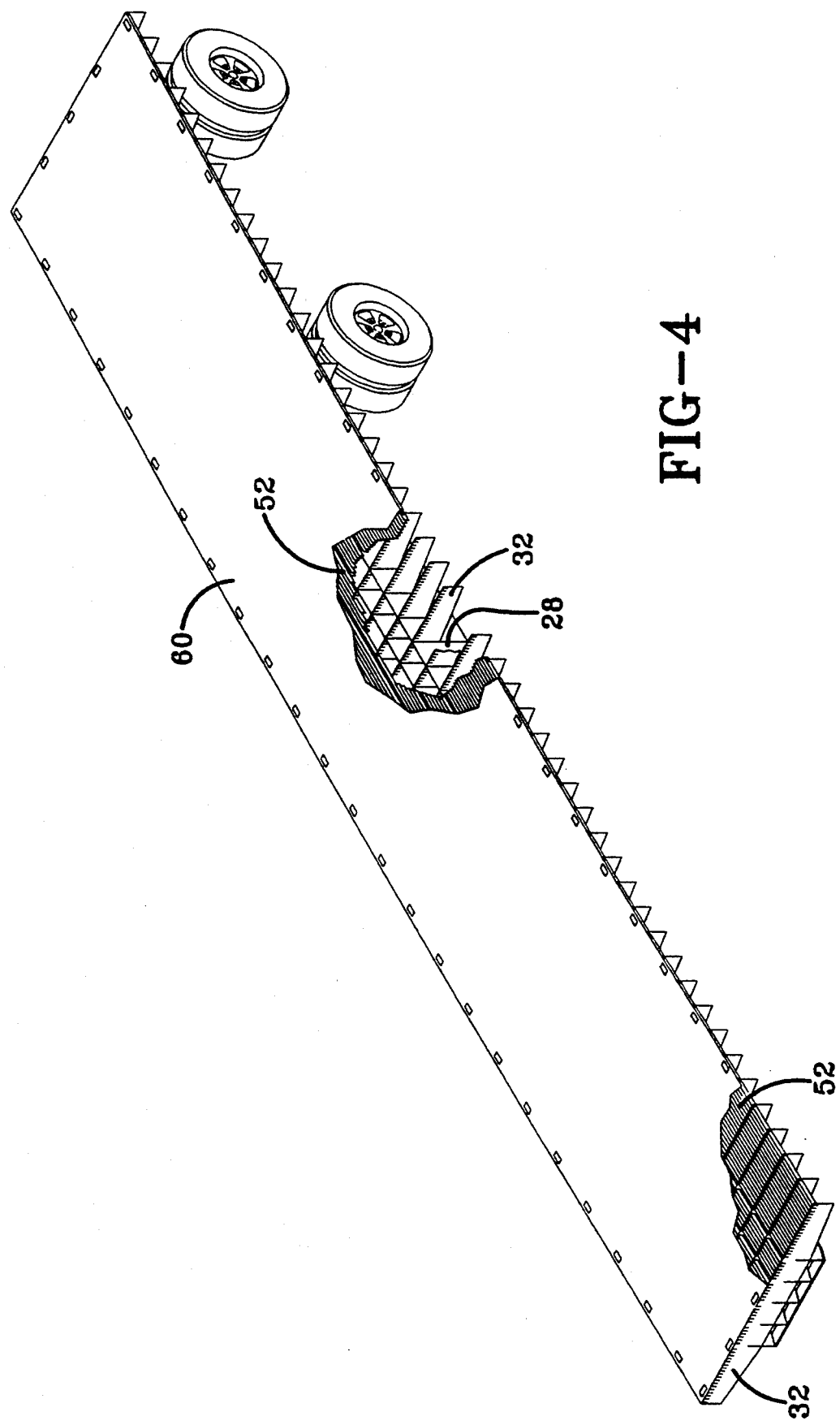
FIG. 4 is a broken away sectioned perspective view showing the assembled trailer.

Referring to FIG. 3, the trailer is completed by mounting conventional wheels 64 and suspension systems 68, king pin plate 24, and landing gear 70 onto the support members 12. The trailer structure is capable of supporting a plurality of wheel axle assemblies at a variety of different positions along the trailer's length as indicated by the dashed circles in FIG. 3.

The trailer described in accordance with the preferred embodiment shown in the figures has a weight of about 6000 pounds (about 2700 kg), which represents a weight advantage over conventional aluminum frame flatbed trailers of about 2500 pounds (about 1100 kg) and about a 4000 pound (about 1800 kg) advantage over conventional steel frame flatbed trailers. The described trailer is capable of carrying up to an 80,000 pound (about 36,000 kg) concentrated load, which is comparable to the conventional trailers and well in excess of the maximum loads permitted in most states. The ability to carry an extra 2500 to 4000 pounds (1100 to 1800 kg) of payload per trip can provide substantial additional revenue during the life of the trailer and is therefore of great utility to the trucking industry.

The structure of the invention has an inherent stiffness which allows for the use of thin, light weight structural components made from materials having a modulus of elasticity lower than that of steel or aluminum, and as low as about $2 \times 10^6$ pounds per square inch (about 14 GPa). The structure is preferably fabricated from a material having a modulus of elasticity in the range between $4 \times 10^6$ and $12 \times 10^6$ pounds per square inch (28 to 83 GPa).

While the invention has been described in great detail with reference to the preferred embodiment wherein a flatbed trailer weighing about 6000 pounds (about 2700 kg) and capable of carrying at least 80,000 pounds (about 36,000 kg) of payload is constructed with aluminum support members 12, an aluminum bottom plate 16, aluminum partitions 28 and 32, aluminum slats 52, and an aluminum top plate 60, it is possible to use different materials, different structural dimensions and different spacings between structural members to fabricate a lightweight flatbed trailer in accordance with the principles of the invention. For instance, steel could be used in place of aluminum to produce a trailer, in accordance with the invention which is lighter than a conventional steel trailer.

Alternatively, strong, lightweight reinforced composite materials can be used to produce a trailer which is as strong yet lighter than the aluminum trailer of the preferred embodiment. Composite materials suitable for use with the invention include conventional fiber reinforced thermoplastic and thermosetting polymers such as polyesters; polystyrene; copolymers of styrene and butadiene; copolymers of styrene and linear alkyds; polymers of styrene derivatives such as alkyl and alkoxy styrenes; acrylic polymers such as polymethyl methacrylate; polymers of acrylic esters such as polymethyl acrylate; other acrylic polymers such as polyacrylonitrile, polyacrylic and polymethacrylic acids; polymers and copolymers of vinyl chloride such as polyvinyl chloride, copolymers of vinyl chloride and vinyl acetate, copolymers of vinyl chloride and vinylidene chloride; polycarbonates, fluorine-containing polymers such as polytetrafluoroethylene, polyvinyl fluoride, and polyvinylidene fluoride; ethylene polymers and copolymers such as the various polyethylenes and copolymers of ethylene with vinyl or vinylidene chloride, methyl methacrylate, acrylonitrile, tetrafluoroethylene, vinyl acetate, and alpha olefins such as propylene or butene-1; nylon; polyethylene terephthalate; polyimides; phenolic polymers; alkyd and diallyl phthalate polymers, polyurethanes; epoxy resins; and the like. Suitable reinforcing fibers for use in practicing the invention include conventional fibers such as those comprised of aramid, carbon, graphite, glass, quartz, silicon carbide, ceramic, metal, nylon, polyester, boron, boron carbide, boron nitride, aluminum silicate, fused silica, acrylics, polyolefins, polyamides, aromatic polyamides, and the like. Such composite materials would preferably have a density as low or lower than that of aluminum, and a modulus of elasticity of at least $2 \times 10^6$ pounds per square inch (14 GPa). The presently preferred composites include fiber reinforced thermosetting materials having a polyester, polyurethane, or epoxy resin matrix.

Such modifications in materials are all within the scope of the disclosure, the preferred embodiment representing only what is currently regarded to be the most cost effective alternative. The spacings between the partitions and the number of partitions can be increased or decreased without sacrificing load bearing capabilities by adjusting the thicknesses of the partitions accordingly. Such modifications in the spacing and dimensioning of structural components are likewise within the scope of the invention.

While the cellular stiffening structure of the invention has been described by reference to the preferred embodiment as comprising a multiplicity of square cells whose opposite sides are arranged parallel and perpendicular with the longitudinal axis of the trailer, various other polygonal cells and geometric arrangements are possible consistent with the disclosure herein. For instance, the transverse partitions can be replaced with partitions which are arranged in parallel at an acute angle with the longitudinal stiffeners to form parallelogram-shaped cells, alternatively, intersecting partitions can be arranged axisymetrically with respect to the longitudinal stiffeners to form triangular cells. All such variations incorporate a cellular stiffening structure comprising a plurality of intersecting partitions which form a multiplicity of individual polygonal cells in accordance with the invention.

While in accordance with the patent statutes, the best mode and preferred embodiment has been set forth, the scope of the invention is not limited thereto, but rather by the scope of the attached claims.

What is claimed is:

1. A flatbed trailer comprising;
   a base having a bottom plate secured to a pair of longitudinal members;
   a cellular structure formed from a plurality of vertically arranged uniformly spaced parallel longitudinal partitions extending substantially the length of the flatbed trailer, and a plurality of uniformly spaced transverse partitions intersecting the longitudinal partitions at a right angle to form a multiplicity of rectangular cells, the longitudinal and transverse partitions having a plurality of interlocking slots to facilitate assembly of the cellular structure, the cellular structure being secured to said base;
   a plurality of stiffening slats secured to the top edges of the cellular structure for transmitting load forces to the cellular structure, the slats being parallel and uniformly spaced apart by a distance substantially less than the spacing between the parallel partitions; and
   a top plate secured to the cellular structure and forming the floor of the flatbed.

2. A flatbed trailer according to claim 1, wherein the longitudinal and transverse partitions are fabricated of aluminum.

3. A flatbed trailer according to claim 1, wherein the longitudinal and transverse partitions are fabricated from a fiber reinforced thermosetting epoxy, polyester, or polyurethane.

4. A flatbed trailer comprising:
   a cellular structure defined by a plurality of longitudinal partitions and a plurality of spaced transverse partitions, said longitudinal and transverse partitions being substantially vertically arranged;
   a top plate integrally joined to the cellular structure for distributing load forces thereto;

a bottom plate integrally joined to the cellular structure for receiving load forces transmitted therefrom; and a plurality of slats secured to said cellular structure, said slats generally being more closely spaced apart than either of said longitudinal or said transverse partitions, the width dimension of said slats being arranged vertically, said slats transmitting load forces from said top plate to said cellular structure.

5. A flatbed trailer according to claim 4, which is formed from a material having a modulus of elasticity less than that of aluminum and as low as about $2 \times 10^6$ pound per square inch.

6. A flatbed trailer according to claim 1, wherein the cellular structure is formed from a plurality of parallel longitudinal partitions extending substantially the length of the flatbed, and a plurality of transverse partitions intersecting the longitudinal partitions at a right angle to form a multiplicity of rectangular cells.

7. A flatbed trailer according to claim 4 wherein said longitudinal partitions and said transverse partitions are made of a strong, light weight material selected from the group consisting of aluminum, fiber reinforced thermosetting epoxy, fiber reinforced thermosetting polyurethane, and fiber reinforced thermosetting polyester.

8. A flatbed trailer according to claim 4, wherein the top edges of the cellular structure are provided with a plurality of slots for receiving the slats.

9. A flatbed trailer according to claim 4, wherein the slats are parallel to one another and more closely spaced apart than either of said longitudinal or said transverse partitions.

10. An integrated structure for a flatbed trailer comprising:

a cellular structure defined by a plurality of spaced longitudinal partitions and a plurality of spaced transverse partitions;

a plurality of slats secured to said cellular structure, said slats generally being more closely spaced apart than either of said longitudinal or said transverse partitions, the width dimension of said slats being arranged vertically;

a top plate joined to the slats for distributing load forces thereto, said slats redistributing said load forces to said cellular structure; and a bottom plate integrally joined to the cellular structure for receiving load forces therefrom.

11. A flatbed trailer according to claim 10, wherein the vertical slats and top plate are integrally formed together.

12. A flatbed trailer according to claim 10, wherein the cellular structure is formed from a plurality of parallel longitudinal partitions extending substantially the length of the flatbed, and a plurality of transverse partitions intersecting the longitudinal partitions at a right angle to form a multiplicity of rectangular cells.

13. A flatbed trailer according to claim 12, wherein the longitudinal partitions are uniformly spaced apart by a first predetermined distance and the transverse partitions are also uniformly spaced apart by a second predetermined distance.

14. A flatbed trailer according to claim 13, wherein the longitudinal and transverse partitions are provided with a plurality of interlocking slots to facilitate assembly of the cellular structure.

15. A flatbed trailer according to claim 14, wherein the slats are parallel to one another and more closely spaced apart than the parallel partitions.

16. A flatbed trailer according to claim 15, wherein the top edges of the cellular structure are provided with a plurality of slots for receiving the slats.

17. A flatbed trailer according to claim 16, wherein the top plate, bottom plate and cellular structure are made of a strong, lightweight material.

18. A flatbed trailer according to claim 17, wherein the strong, lightweight material is aluminum.

19. A flatbed trailer according to claim 17, wherein the strong, lightweight material is a fiber reinforced thermosetting epoxy, polyurethane, or polyester.

* * * * *